Nov. 12, 1957  V. FOGH  2,812,814
FLEXIBLE GATE AND LATCH MEANS THEREFOR
Filed April 11, 1955  2 Sheets-Sheet 1

INVENTOR.
VICTOR FOGH
BY
Bruce & Brosler
HIS ATTORNEYS

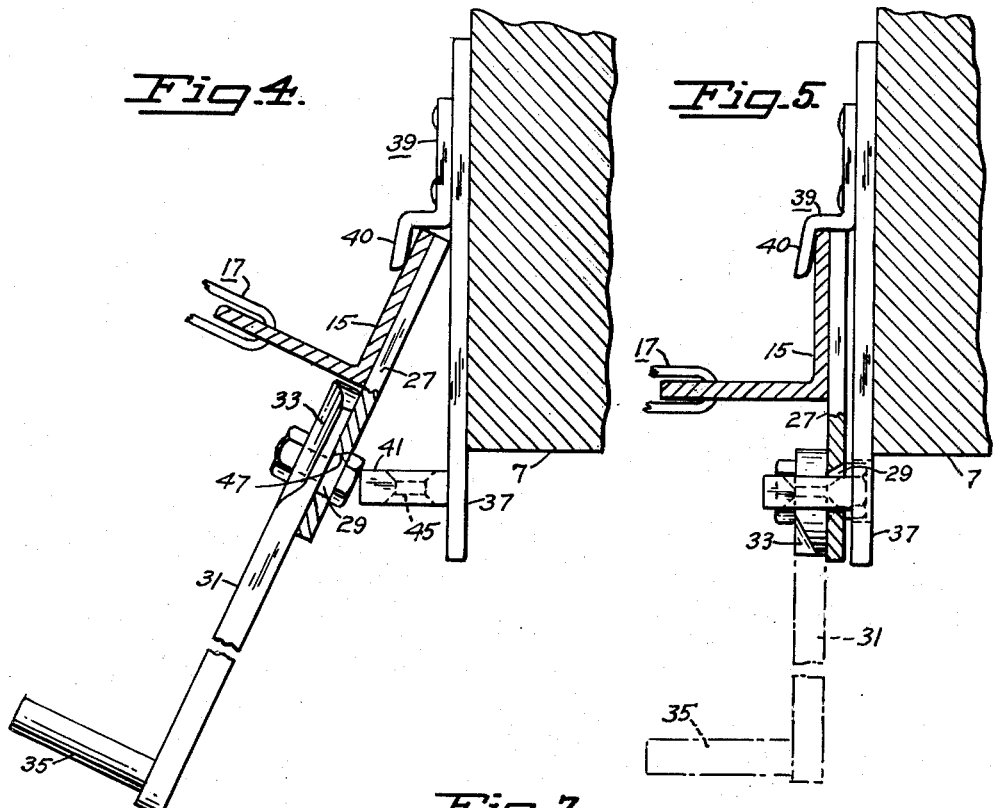

United States Patent Office 2,812,814
Patented Nov. 12, 1957

2,812,814

FLEXIBLE GATE AND LATCH MEANS THEREFOR

Victor Fogh, Oakland, Calif., assignor to Inter-Urban Express Corporation, Oakland, Calif., a corporation of California Application April 11, 1955, Serial No. 500,429

2 Claims. (Cl. 160—328)

This invention relates to flexible gates suitable for use on vehicle bodies such as automobile trucks and trailers, wagons, railroad cars, boats, etc., and more particularly to gates fabricated from flexible chains or the like, and latch means therefor.

Various forms of chain gates have been proposed heretofore for use on vehicle bodies to close the normally open ends thereof. In general, these gates comprise a plurality of cross-connected vertical and horizontal chains. The vertical chains, together with a rigid, vertically extending bar at one end, are mounted to slide along one or more horizontal rods carried by the vehicle body, these chains and bar sliding on the horizontal rods as the gate is moved from one to the other of its open and closed positions. The horizontal chains are usually anchored to the body at one end and are connected to the aforementioned bar at their other ends, being coupled to the vertical chains to hang therefrom. Thus, as the gate is opened, the horizontal chains fold somewhat in accordion pleat fashion, and they become extended as the gate is closed.

For maintaining the gate closed, there is usually provided a hasp type fastener. Now when the gate is in closed position, it is desirable that the horizontal chains shall be quite taut. In order to realize even a reasonable degree of tautness in these chains, the full strength of the operator is usually required, even if he uses both hands, to close the gate to the point where the hasp can be engaged and the horizontal chains maintained taut.

The primary object of my invention is to provide an improved chain gate and closing means therefor which will be free from the aforementioned difficulty.

More particularly, it is an object of my invention to provide an improved chain gate which can be closed with ease, and the chains of which can be rendered taut without any difficulty whatsoever when the gate is closed.

Another object of my invention is to provide an improved gate closing and latching mechanism for chain gates by means of which tightening of the horizontal chains of the gate in a positive manner, upon closing of the gate, is assured.

Still another object of my invention is to provide an improved chain gate as aforesaid which can be closed easily by an operator even when using only one hand and without need to exert undue force.

A further object of my invention is to provide an improved chain gate in which the chains are so coupled to each other as to afford complete freedom of movement of any one chain with its cross-coupled chains.

It is also an object of my invention to provied an improved chain gate structure, including improved closing and latching mechanism therefor, which is simple in construction, easy to operate, and highly efficient in use.

The foregoing and other objects and advantages of my invention can be attained by providing on the vertically-extending, horizontally movable bar to which one end of each of the horizontal chains is attached, a moment arm which cooperates with a fixed portion of the latching mechanism to bring the gate to closed, latching position with the horizontal chains under initial tension. A cam surface on the latching end of a pivotally secured latch bar forming part of the moment arm, is then used to increase the tension of the horizontal chains to full tension as the latch bar is swung into latching position.

To provide freedom of action between the various crossed chains at their cross-over points during opening and closing of the gate, the crossing links are maintained free of each other.

Thus, there is provided an improved chain gate which can be closed readily, and which can be operated either to or from closed position, with one hand.

The invention, both as to its organization and method of operation, as well as additional objects and advantages thereof, will be understood more fully from the following description, when read in connection with the accompanying drawings, in which:

Figure 4 is a view, partly in section, of the gate latching mechanism forming part of my invention with the moment arm shown in position about to effect complete closure of the gate and initial tensioning of the horizontal chains;

Figure 5 is a view similar to Figure 4, but showing the moment arm in the position it occupies when the gate is fully closed and the horizontal chains are fully tensioned;

Figure 6 is a front elevation of the mechanism shown in Figure 5, the latch bar being shown in engagement with the keeper of the latching mechanism; and Figure 7 is a fragmentary, exploded, perspective view showing, in detail, the latching mechanism of Figures 4–6.

Figure 1:
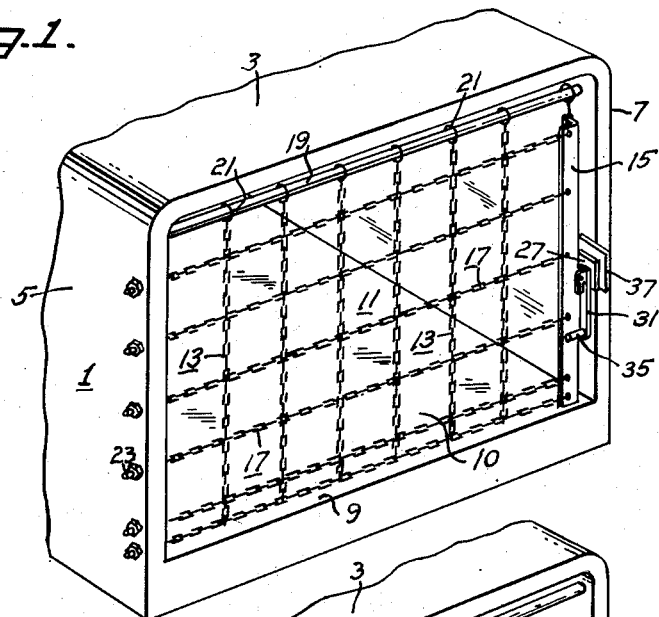
Figure 1 is a fragmentary perspective view of the rear end of a vehicle body having one form of gate structure according to my present invention, the gate being shown closed and latched.
Figure 2:
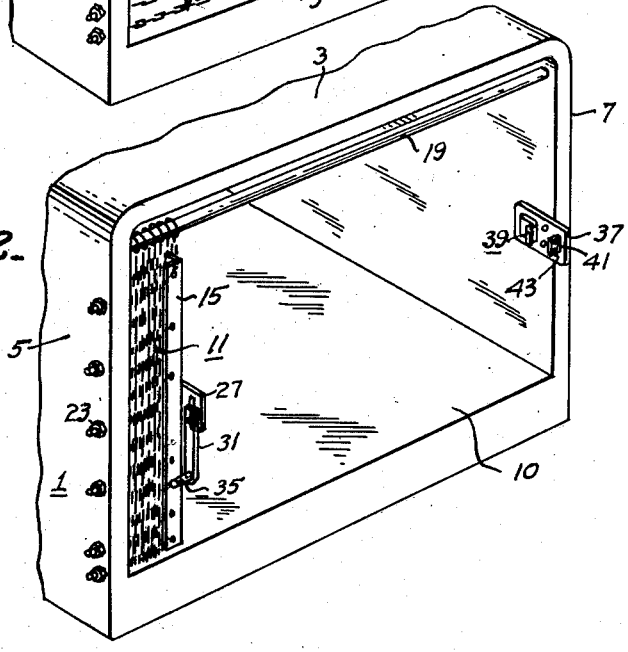
Figure 2 is a similar view but showing the gate open.

Referring more particularly to the drawings, there is shown in Figures 1 and 2, by way of example, the rear end of a truck body 1 having a roof 3, side walls 5 and 7 and a floor 9, the body having an open end 10 constituting an access opening, through which access may be gained into the body. For closing this open end, I have provided a collapsible gate 11 which has a plurality of vertical chains 13, a vertical end bar 15, and a plurality of horizontal chains 17 which are cross-coupled to the vertical chains 13.

The vertical chains 13 and the end bar 15 are suspended from a horizontal rod 19 just under the roof 3, by means of rings 21, so as to be slidable horizontally along the rod 19, between the closed position of the gate across the opening 10, as shown in Figure 1, and the open position shown in Figure 2. The horizontal chains 17 are anchored at one end to the side wall 5 in any suitable manner, as by means of eye-bolts and nuts 23, and at their other ends are linked to the end bar 15.

Figure 3:
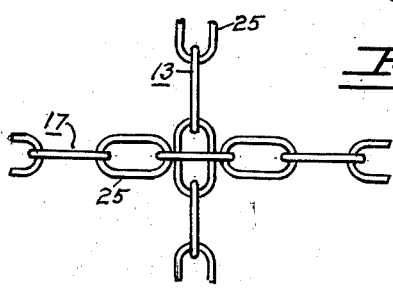
Figure 3 is a fragmentary detail view showing the manner in which intersecting chains of the gate are coupled.

Each of the chains 13 and 17 is formed of a plurality of loosely connected oval links 25 disposed alternately in planes substantially normal to each other, as seen in Figure 3. At the points of intersection of the vertical chains with the horizontal chains, a link of one passes freely through a link of the other to provide a loose or free coupling.

To accomplish such loose or free coupling, the "outer" link to be in the one chain, is spread sufficiently to permit threading of the crossing chain therethrough until the "inner" link to be, reaches its position, following which the outer link is restored to its original shape. This keeps the horizontal chains from sagging when the gate is open, and without the need for welding or bolting the vertical and horizontal chains to each other at their points of intersection, as in previously known chain type gates. In addition, the greater freedom of movement permitted by such coupling, greatly facilitates the operations of opening and closing of the gate by an operator.

The end bar 15 may be in the form of an angle iron, to one face of which is secured, as by welding, a plate 27 having a slot 29 therein. Pivotally mounted on this plate at a point beneath the slot, is a latch bar 31, having at one end a beveled or cammed edge 33, while at its other end, the latch bar carries a handle 35.

Mounted on the wall 7 of the vehicle body, in a fixed location, is a second or anchor plate 37 which has secured thereto a bracket 39 having a free end 40 spaced from the plate 37. Also secured to the plate 37 is a keeper 41 having a notch 43 at its lower end for reception of the latch bar 31.

When the gate 11 occupies the open position depicted in Figure 2, the vertical chains 13 and the end bar 15 are contiguously disposed with the horizontal chains 17 looped in sections between them.

To close the gate, the operator, with the latch bar in his grasp, expands the gate to the point where the plate 27 and adjacent portion of the angle iron bar 15 may be inserted behind the bracket end 40, which acts as a fulcrum, as shown in Figure 4, whereupon the latch bar 31 and plate 27, together functioning as a lever, may be swung toward the anchor plate 37 until the plate 27 assumes a position alongside of the anchor plate 37, as shown in Figure 5, with the keeper 41 passing through the slot 29. At this stage in the closing operation, the horizontal chains are under an initial tension, which may be of substantial value. However, by pulling down on the latch bar at this point to bring its cammed edge into the notch 43 of the keeper (see Figures 6 and 7) additional tension may be imparted to the horizontal chains, whereby the gate becomes closed quite tightly, at the moment of latching.

The loose couplings between the vertical and horizontal chains assure uniform tension throughout the horizontal chains when the gate is thus closed. Locking of the gate in its closed condition is provided for by a hole 45 in the exposed end of the keeper, through which to hang a suitable padlock.

To preclude latching of the gate without first inserting the plate 27 and angle bar 15 behind the fulcrum bracket, I prefer to make the slot 29 just sufficient to pass the keeper, and then angle or bevel the nearest edge 47. Under these conditions, any attempt to bring the keeper through the slot without using the bracket 39 as a fulcrum, will not meet with success.

From the foregoing description, it will be apparent that I have provided an improved chain gate and mechanism which greatly facilitates closing the gate and placing the horizontal chains thereof under considerable tension. The gate herein described can be operated to closed position and latched therein easily with but one hand and without need to exercise undue force.

Although I have shown and described only a single form of flexible or collapsible gate according to my invention, it will undoubtedly be apparent that many other forms thereof, as well as changes in the particular one disclosed, are possible within the spirit of the invention. For example, insofar as the latch mechanism is involved, chains are not essential in the fabrication of the gate structure. Rope, cable or even "lazy tong" type structure might well be employed. I therefore desire that the foregoing description be taken merely as illustrative and not as limiting, except as may be necessitated by the appended claims.

I claim:

1. A chain gate comprising a plurality of vertical chains and a vertical end bar, a plurality of horizontal chains loosely cross-connected to said vertical chains and also connected to said end bar, said vertical chains and end bar being movable horizontally between open and closed positions of said gate, and said horizontal chains becoming collapsed as said gate is opened and extended as said gate is closed, a relatively fixed member, a pivot element on said fixed member, a moment arm on said end bar engageable with said pivot element when said gate is partly closed to provide for swinging movement of said moment arm on said pivot element to thereby bring said end bar into proximity with said fixed member and thus bring said gate into substantially fully closed position and also to place said horizontal chains under initial tension, a keeper on said fixed member, said keeper having a notch therein, and a latch bar pivotally mounted on said moment arm, said latch bar being positioned to be moved into said notch when said gate is in said substantially closed position, said latch bar having a cam surface adapted to engage said keeper when said latch bar enters said notch for effecting full and tight closure of said gate and simultaneously placing said horizontal chains under final tension greater than said initial tension while also simultaneously latching said gate in said fully closed position.

2. A chain gate comprising a plurality of vertical chains and a vertical end bar, a plurality of horizontal chains loosely cross-connected to said vertical chains and also connected to said end bar, said vertical chains and end bar being movable hoizontally between open and closed positions of said gate, and said horizontal chains becoming collapsed as said gate is opened and extended as said gate is closed, a relatively fixed latching plate having thereon a pivot element and a keeper spaced from said pivot element and provided with a slot, a moment arm secured to said end bar for movement therewith, said moment arm having a slot therein for reception of said keeper, and a latch bar pivotally mounted on said moment arm for cooperation with said keeper, said moment arm being movable into engagement with said pivot element upon closure of said gate to swing thereon toward said latch plate and thus move into proximity to said latch plate and receive said keeper in its said slot thereby to bring said gate to fully closed position and place said horizontal chains under initial tension, and said latch bar thereupon being adapted to move pivotally into said notch to latch said gate in fully closed position, said latch bar having a cam surface for cooperation with said keeper to draw said horizontal chains tight as said latch bar enters said notch.

References Cited in the file of this patent

UNITED STATES PATENTS

| 1,016,479 | Coyne et al. | Feb. 6, 1912 |
| 2,612,221 | Dellapent | Sept. 30, 1952 |
| 2,664,154 | Evers | Dec. 29, 1953 |